March 3, 1970  D. W. SAMES  3,498,559
WINDING DEVICE FOR USE WITH REPRODUCTION MACHINES
Filed Nov. 6, 1967  2 Sheets-Sheet 1
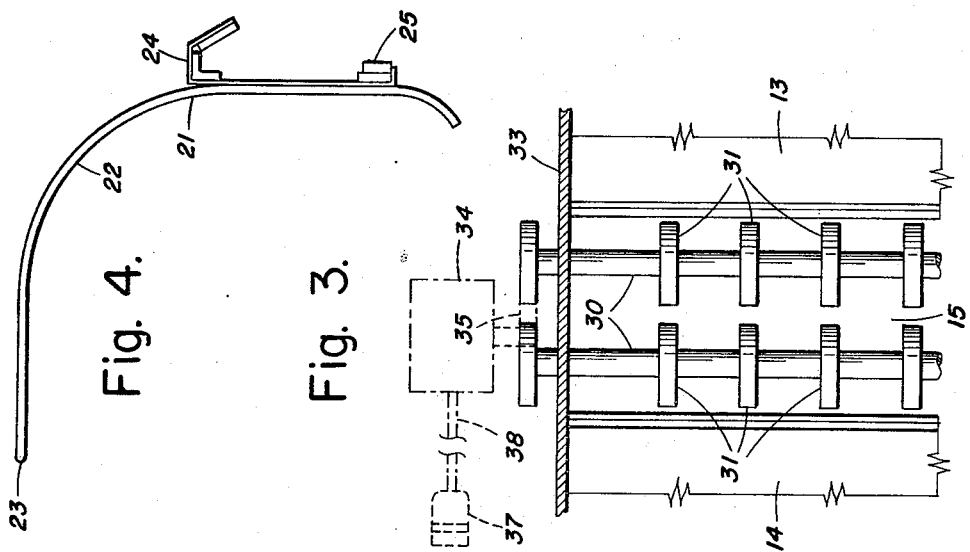
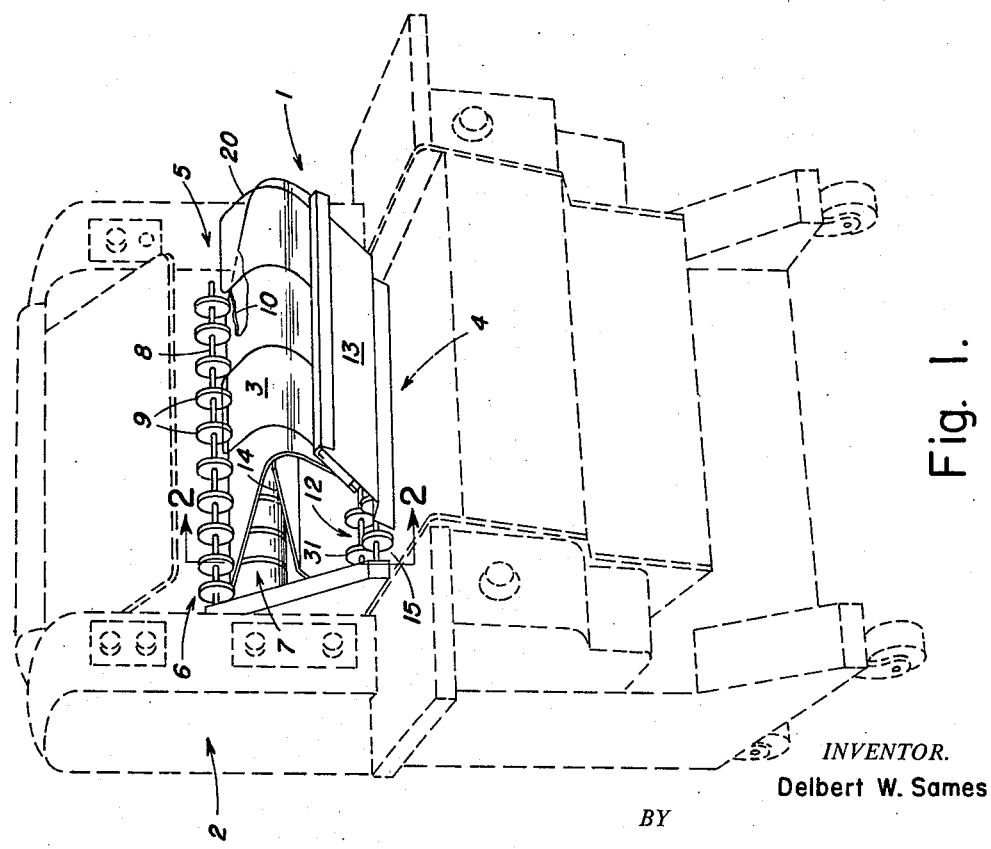
INVENTOR.
Delbert W. Sames
BY
Edward H. Loveman
ATTORNEY March 3, 1970  D. W. SAMES  3,498,559
WINDING DEVICE FOR USE WITH REPRODUCTION MACHINES
Filed Nov. 6, 1967  2 Sheets-Sheet 2

INVENTOR.
Delbert W. Sames
BY
Edward H. Loveman
ATTORNEY

United States Patent Office 3,498,559
Patented Mar. 3, 1970

3,498,559
WINDING DEVICE FOR USE WITH REPRODUCTION MACHINES
Delbert W. Sames, Conklin, N.Y., assignor to General Aniline & Film Corporation, New York, N.Y., a corporation of Delaware
Continuation-in-part of application Ser. No. 591,885, Nov. 3, 1966. This application Nov. 6, 1967, Ser. No. 680,665
Int. Cl. B65h 17/08
U.S. Cl. 242—67.2    7 Claims

ABSTRACT OF THE DISCLOSURE

The present invention relates to a winding device for use with reproduction machines, and more particularly, to a device adapted to wind into a roll form an original sheet ejected from a machine in which the original has been reproduced. Specifically, the winding device employs an original sheet receiving hopper having a positively driven friction roller adapted to cooperate with contoured surfaces of the hopper in forming the sheet into a relatively compact roll form.

---

The present invention has particular utility when used to receive an original sheet ejected from reproduction machines of the type which are adapted to reproduce indicia carried on the original, which may be many feet in length, on a sheet of copy paper which corresponds in length to the original sheet. This application is a continuation-in-part of application Ser. No. 591,885, filed Nov. 3, 1966, now abandoned.

Heretofore, when employing reproduction machines of the type suitable for use in reproducing in one continuous operation original sheets having lengths measured in feet, it has been a common practice to permit the original when ejected from the machine to collect on the floor or to assign the machine operator the task of progressively gathering the ejected sheet by hand, such as by folding. Oft-times, such practice resulted in damage, as by tearing, smearing or marking to the master sheet. Alternatively, racks, trays, or the like, have been provided to receive ejected original sheets. However, as far as I am aware, the use of racks or the like required that the original sheet be gathered in a folded or accordion-like fashion and in many instances, require that the operator physically manipulate the original to insure uniform collection thereof. Furthermore, the racks employed were of necessity large structures to permit the original to be collected in loose folds in an attempt to prevent undesired creasing of the original.

In addition to the disadvantages already mentioned, it has been found that in prior practices, special attention on the part of the operator is necessary to remove lengthwise extending ripples or the like often found to be present in an original sheet upon ejection thereof, from many reproduction machines now available. If such ripples are not fully removed prior to collection of the original, difficulty may be experienced during subsequent handling of the original, such as during a second reproduction operation.

Accordingly, it is an object of the present invention to provide means to collect an original ejected from a reproduction machine, which is not subject to the above discussed disadvantages.

A specific object of the present invention is to provide a device adapted to collect in compact roll form an original ejected from a reproduction machine.

Yet another object of the present invention is to provide a device adapted to collect in compact roll form an original ejected from a reproduction machine, wherein the device includes a detachably mounted paper guide portion which may be removed to permit access to the rolled-up original by an operator.

A further specific object of the present invention is to provide a device to remove lengthwise extending ripples or the like from an original sheet ejected from a reproduction machine prior to winding of the original into compact roll form.

These and other objects and many of the attendant advantages of this invention will be readily appreciated as the same becomes better understood by reference to the following detailed description considered in connection with the accompanying drawings in which:

FIG. 1 is a perspective view of the winding device of the present invention illustrating the positioning thereof on a suitable reproduction machine illustrated in phantom, and with the side wall of the device shown removed;

FIG. 3 is a fragmentary view taken generally along line 3—3 in FIG. 2, showing the drive arrangement for the friction rollers of the winding device of the invention and the drive guard thereof;

FIG. 4 is an enlarged side elevational detail view of the detachable paper guide illustrated in FIG. 2.

Figure 2:
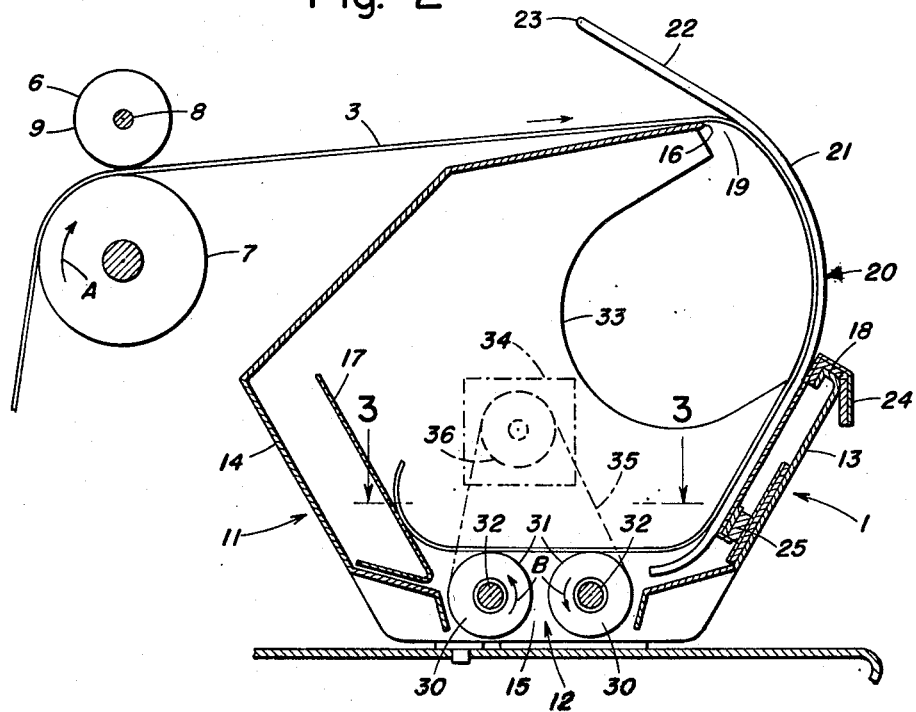
FIG. 2 is a sectional view taken generally along the line 2—2 in FIG. 1.

Referring now to the drawings, wherein like reference characters designate like or corresponding parts throughout the several views, there is shown in FIG. 1 a winding device of the present invention generally indicated by reference numeral 1 as being mounted on a reproduction machine which is shown in phantom and generally designated by reference numeral 2.

At the outset, it will be understood that, while the winding device of the present invention is of more general utility, it is particularly adapted for use in collecting an original ejected from machines of the type adapted to reproduce in one continuous feeding operation, originals, which may be many feet in length. Briefly, an original sheet 3 to be reproduced is presented to the machine through a feed opening 4, whereafter the original is passed in a continuous feeding operation through an exposure section of the machine, not shown, in superimposed relationship with a copy sheet of paper, also not shown. Thereafter, the original is separated from the copy sheet and positively ejected from the machine, as at 5. An assembly employed to eject the original from the machine is shown in full line in the drawings as including upper and lower feed means 6 and 7, respectively, which are adapted to frictionally engage the upper and lower surfaces of the original. Normally, lower feed means 7 is in the form of a continuously powered roller over which are passed a plurality of spaced original sheet conveyor belts, not shown. Upper feed means 6 is shown as being in the form of a freely rotatable shaft 8 having a plurality of spaced roller discs 9, which are adapted to be driven by frictional surface engagement with either the lower feed means 7 or the original. It has been found that upon emerging from the machine, the original sheet contains lengthwise extending ripples, such as generally indicated as reference numeral 10, in FIG. 1. It is believed that such ripplies are formed due to the transversely non-uniform feeding of the original occasioned by the use of a plurality of conveyor belts or the action of roller discs 9.

Winding device 1 is shown in the drawings as including an original sheet receiving hopper, generally indicated as reference numeral 11; and a powered friction roller, generally indicated as reference numeral 12, which is adapted to cooperate with the hopper to wind an original shet presented thereto into a roll.

Referring to FIGS. 1 and 2, it will be seen that hopper 11 is in the form of an open top, open ended structure which is adapted to be disposed transversely of the path of travel of original sheet 3 upon ejection thereof from machine 2. Hopper 11 is shown as including a front wall portion defined by a downwardly and inwardly inclined panel 13, a rear wall portion defined by a contoured panel 14, and an open bottom aperture 15 defined by the lower extremities of panels 13 and 14 (FIG. 2).

In FIG. 2, rear wall defining panel 14 is shown as having a smooth guide edge surface 16, and having mounted thereto an inclined paper guide surface, generally indicated as reference numeral 17, which extends upwardly from adjacent aperture 15 rearwardly toward the upper part of panel 14. Further, it will be apparent from viewing FIG. 2 that the upper edge 18 of front wall panel 13 cooperates with guide edge 16 in defining an opening indicated at 19 through which an original is passed into the hopper. Preferably, edge 18 is disposed below edge 16 to facilitate access to the hopper and to permit visual inspection of the hopper from the front of machine 2. For the purpose hereinafter discussed, the upper portion of rear wall panel 14 is extended forward over aperture 15 to permit guide edge 16 to overlie front wall panel 13. If desired, panels 13 and 14 may be formed of extruded aluminum sections, or from sheet material segments.

Referring specifically to FIG. 2, it will be seen that when the winding device is mounted in operable position on machine 2, the guide edge 16 is disposed at a higher elevation than the point at which the original sheet is ejected from the machine, thereby requiring the original sheet to approach the edge guide along an upwardly inclined plane. I have found that by positioning the edge guide in the manner described, the ripples present in the original sheet are completely removed in passing over the guide edge. In tests conducted with the guide edge at the same or at lower elevations than the point at which the original is ejected from the machine, the ripples are not completely removed from the sheet and difficulties are encountered in properly forming the sheet into a roll form.

Figure 5:
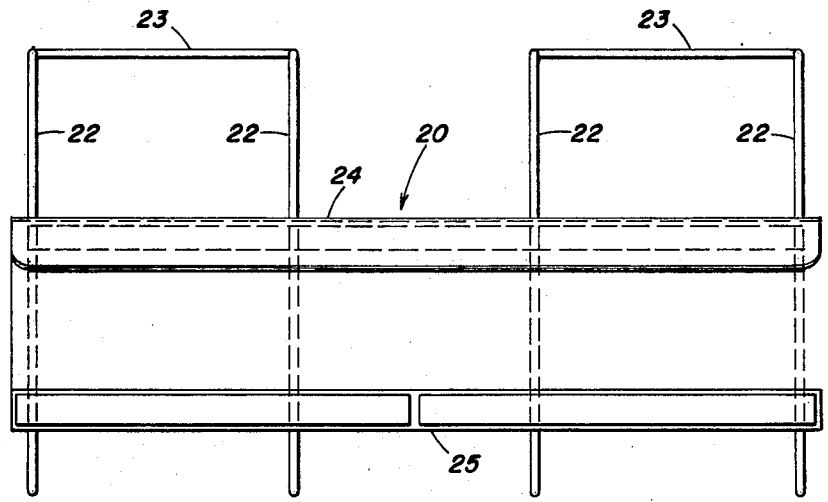
FIG. 5 is a front elevational view of the detachable paper guide illustrated in FIG. 4.

In the specific embodiment of the present invention illustrated in the drawings, in order to guide the leading end portion of the original sheet over the guide edge 16 through opening 19 and into hopper 11, a detachable guide surface member 20 is mounted on the front wall panel 13. The guide member 20, referring in particular to FIGS. 4 and 5 of the drawings, comprises a pair of spaced curved wire units 21, each of which includes two parallel curved portions 22 extending from adjacent the upper edge of panel 13 above opening 19 and guide edge 16 on panel 14. The curved portions 22 at their upper extremities are bent toward each other to form a connecting cross-bar 23. The lower portions of wire units 21 extend down in parallel spaced relationship with the inner surface of front wall panel 13, and terminate in proximity to aperture 15 so as to constitute a guide surface for the original sheet being conveyed into hopper 11.

Wire units 21 are interconnected by a sheet metal member 24 which is adapted to extend along the upper edge of front wall panel 13, and which is of generally hook-shaped cross-section. The hook-shaped configuration of member 24 permits the guide surface member 20 to be mounted on and removed from panel 13 in a simple and expedient manner. A further transverse member 25 is connected to and extends between wire units 21 near the lower portions thereof, so as to provide a further stiffener for the guide surface member 20, and also to permit the latter to be positioned firmly against front wall panel 13 when in a mounted position.

When lengthy original sheets are ejected from the reproduction machine 2 and passed over guide edge 16 on panel 14, the guide surface member 20 is mounted in place on panel 13. This will automatically curve the leading end of the original sheet, upon contact with curved portions 22, down toward opening 19 and into hopper 11. The sheet is now conveyed down toward aperture 15.

A pair of spaced friction rollers 30 is shown as being in the form of a plurality of roller discs 31 keyed for rotation on two parallel, spaced shafts 32, which are supported for rotation at each of their ends within bearings, not shown. The shafts 32, positioned within the bearings are rotatably journaled between a pair of hopper side walls 33, which are positioned at the opposite sides of panels 13 and 14.

Referring specifically to FIGS. 2 and 3 of the drawings, it will be seen that friction rollers 30 are disposed within aperture 15 so that the roller discs 31 thereof are adapted to project slightly above the lower edges of panels 13 and 14 to permit the roller discs to frictionally engage the surface of original sheet 3 when the latter is passed into the hopper 11 in a manner hereinafter described.

In the preferred embodiment of the present invention, the friction rollers 30 are driven by a motor 34, which is mounted on one of the side walls 33, through a suitable motion transmitting means, such as a drive chain or belt 35, entrained about sprockets or pulleys 36 which are mounted on the ends of shafts 32, repsectively. Generally, rollers 9 are driven in a direction indicated by arrow A, due to the frictional contact with original sheet 3, and roller discs 31 are driven in a direction indicated by arrow B at a peripheral surface speed in excess of the linear surface speed of the original sheet, as the latter is ejected from machine 2. It has been found that there exists a relationship between the ratio of roller surface to original sheet speed and the size or diameter of the first convolution formed in the original sheet, and that within limits an increasing ratio reduces the diameter of the first convolution. Further, I have found that for the geometry of the hopper illustrated in the drawings, the linear surface speed of rollers 31 should be approximately 50% faster than the speed of the original. It will be understood that by forming the initial convolution of relatively small diameter a greater length of original may be received within a hopper of any given size. By referring particularly to FIG. 3 it will be understood that side walls 33 function initially to provide an edge guide for the leading end portion of the original sheet to reduce transverse flutter thereof upon engagement of the sheet with friction rollers 31 and thereby insure proper forming of the first roll convolution. Thereafter, side walls 33 in addition to preventing foreign objects from contacting chain or bolt 35, also serve to restrict axial motion of the forming roll.

The motor 34 is connected by means of a cable 38 to an electrical plug 37 which may be electrically connected to a suitable electrical outlet (not shown) on the reproduction machine 2 when the hopper 11 is positioned thereon.

In operation, the leading edge portion of a continuously ejected original sheet is initially slidingly engaged by guide edge 16 whereby any ripples in the original sheet are completely removed as hereinbefore described. Thereafter, the leading edge portion of the original sheet is curved downwardly upon contacting guide surface member 20, and moves downwardly into engagement with front wall panel 13 which in turn guides the sheet downwardly and rearwardly through a curved path of about 180° engagement with friction rollers 31. Upon contact with the friction rollers 31, the sheet is tensioned and forced to travel along a path defined by the upwardly inclined guide surface 17 and thereby progressively winds itself into a roll form; the size of the roll being dependent upon the length of the sheet and the relative speeds of the friction rollers, which determines the size of the first roll convolution formed. During the winding operation, the hopper side walls 33 function as edge guides for the original sheet to insure proper forming of the roll. When the roll comprised of the original sheet is completely formed, the guide surface member 20 is detached from panel 13, and the roll is removed from the hopper, and may thereafter be stored in compact form within, if desired, a cylindrical protecting tube or canister. The guide surface member 20 is now re-mounted on panel 13 and the hopper 11 is ready to receive the next successive original ejected from machine 2.

Although the preferred embodiment described above contains a drive motor for rotating the friction roller 30, it should be understood that, if desired, the friction rollers may be coupled to a drive source within the reproduction machine.

The winding device of the present invention also has utility when employed to receive a copy paper sheet which corresponds in length to the original sheet to be reproduced in the general type of reproduction machine described. Accordingly, while the foregoing description and appended claims recite the term original, it is to be understood that the term original is to be construed in a generic sense to include either an original or a copy sheet.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A winding device in combination with a reproduction machine of the type adapted to reproduce lengthy originals in sheet form and having means for ejecting said originals from the machine along a substantially horizontal path, said winding device being adapted to receive and wind into a roll said ejected originals, said winding device comprising:
   a hopper having a substantially upwardly facing opening extending transversely of the path of travel of said original ejected from said machine, said hopper comprising,
      a substantially horizontal first guide surface portion forming at the upper edge thereof one wall of said opening and adapted to support and guide into such opening the downwardly facing surface of said original when passed from said machine,
      a second guide surface portion in opposed spaced relation to said first guide surface portion and forming the second wall of said opening, said second guide surface portion including a detachably mounted curved guide surface means adapted to engage and direct the leading upper leading edge of said ejected original downwardly through said opening and into said hopper whereby said curved surface guide means engages and guides the resulting downwardly extending portion of said original around a curved path of about 180 degrees, so that the originally upwardly facing surface of the original faces downwardly, and friction roller means disposed adjacent the bottom of said hopper intermediate said first and second guide surface portions in parallel alignment thereto, and adapted to be driven at peripheral surface speeds in excess of the linear surface speed at which said original is ejected from said machine, whereby when a leading edge portion of said original is passed over said first guide surface portion and deflected downwardly through said opening by said curved guide surface means, such originally upwardly facing surface of said leading edge portion is guided by said second guide surface portion downwardly and then rearwardly into engagement with said roller means and the opposite side of said first guide surface portion, and thereby positively driven into engagement with said first guide surface portion to force said original to wind upon itself into a roll within such hopper.

2. A combination as defined in claim 1 wherein said curved guide surface means comprises a plurality of arcuate members extending above said opening toward said machine and adapted to guide said ejected original through said opening,
   means rigidly interconnecting said arcuate members, said means including hook portions for engaging the upper edge of said second guide surface portion so as to detachably mount thereon said curved guide surface means.

3. A combination as defined in claim 2 wherein said arcuate members each comprise wires including arcuate segments extending above said opening toward said machine, said segments being in interconnected relation transverse to the path of travel of said ejected original, and
   said wires including depending portions extending along said second guide surface portion toward said roller means.

4. A combination as defined in claim 1 wherein such opposite side of said first guide surface portion includes an inclined wall member adapted to impart upwardly inclined movement to the leading edge of said original.

5. A combination as defined in claim 1 wherein said hopper includes an inlined upper wall surface having an edge constituting one edge of said opening in parallel spaced relation to said second guide surface portion,
   said upper wall surface being somewhat inclined so as to require said original when passed directly from said machine toward said edge to approach said edge along an upwardly inclined plane.

6. A combination as defined in claim 1 wherein said hopper includes side wall members encompassing said first and second guide surface portions,
   said friction roller means being mounted on a shaft rotatably journaled between said side wall members, and
   motor drive means mounted on at least one of said side wall members and drivingly connected to said shaft so as to impart rotation to said roller means.

7. A combination as defined in claim 6 including a pair of said shafts in parallel spaced relation, each of said shafts mounting said friction roller means in parallel spaced relation to each other, and
   means interconnecting said shafts so as to impart synchronous rotative motion thereto in response to rotation of said motor drive means.

References Cited

UNITED STATES PATENTS

| | | | |
|---|---|---|---|
| 2,551,866 | 5/1951 | Bevins et al. | 242—67.2 |
| 3,077,316 | 2/1963 | Wells et al. | 242—67.2 |

STANLEY N. GILREATH, Primary Examiner

W. H. SCHROEDER, Assistant Examiner

U.S. Cl. X.R.

242—66, 78.2